(12) United States Patent
Uchiyama et al.

(10) Patent No.: US 8,289,938 B2
(45) Date of Patent: Oct. 16, 2012

(54) ACCESS CONTROL SYSTEM IN WIRELESS LAN SYSTEM

(75) Inventors: Motohiro Uchiyama, Kawasaki (JP); Takahide Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1231 days.

(21) Appl. No.: 10/567,703

(22) PCT Filed: Oct. 3, 2003

(86) PCT No.: PCT/JP03/12699
§ 371 (c)(1),
(2), (4) Date: Aug. 10, 2009

(87) PCT Pub. No.: WO2005/034433
PCT Pub. Date: Apr. 14, 2005

(65) Prior Publication Data
US 2009/0296669 A1    Dec. 3, 2009

(51) Int. Cl.
*H04W 4/00*    (2009.01)
(52) U.S. Cl. ........ 370/338; 370/348; 370/341; 370/329; 370/315; 455/69; 455/512
(58) Field of Classification Search .................. 370/341, 370/329, 315, 395.42, 348, 338; 455/69, 455/512
See application file for complete search history.

(56) References Cited

U.S. PATENT DOCUMENTS

| | | | | |
|---|---|---|---|---|
| 6,097,717 A * | 8/2000 | Turina et al. | ................... | 370/348 |
| 6,745,013 B1 * | 6/2004 | Porter et al. | ................... | 455/69 |
| 7,313,407 B2 * | 12/2007 | Shapira | ................... | 455/512 |
| 7,319,687 B2 * | 1/2008 | Tsutsumi et al. | ................... | 370/338 |
| 2003/0212787 A1 * | 11/2003 | Qiu et al. | ................... | 709/224 |
| 2007/0097941 A1 * | 5/2007 | Le et al. | ................... | 370/341 |
| 2007/0153802 A1 * | 7/2007 | Anke et al. | ................... | 370/395.42 |
| 2008/0037457 A1 * | 2/2008 | Matsukura et al. | ................... | 370/315 |
| 2008/0259853 A1 * | 10/2008 | Ito | ................... | 370/329 |
| 2010/0074190 A1 * | 3/2010 | Cordeiro et al. | ................... | 370/329 |

FOREIGN PATENT DOCUMENTS

| | | |
|---|---|---|
| JP | 8-186567 | 7/1996 |
| JP | 11-234738 | 8/1999 |
| JP | 2000-244523 | 9/2000 |
| JP | 2000-253017 | 9/2000 |

OTHER PUBLICATIONS

International Search Report dated Jan. 13, 2004.

* cited by examiner

*Primary Examiner* — David Q Nguyen
(74) *Attorney, Agent, or Firm* — Katten Muchin Rosenman LLP

(57) ABSTRACT

In a wireless LAN system using an access point to perform access control for accesses from a plurality of client terminals, an access point and each of a plurality of client terminals have a transmission means using a data transmission carrier wave frequency and a control signal transmission carrier wave frequency; each of the plurality of client terminals has a memory storing priority information; when the data transmission carrier wave frequency is not sensed on the wireless LAN, data are transmitted to the access point at a relevant data transmission carrier wave frequency; when the data transmission carrier wave frequency is sensed on the wireless LAN, a band reservation request is sent to the access point at a relevant control signal transmission carrier wave frequency along with priority information stored in the memory; and after a transmission confirmation is received from the access point for the band reservation request, data is transmitted to the access point at a relevant data transmission carrier wave frequency.

9 Claims, 11 Drawing Sheets

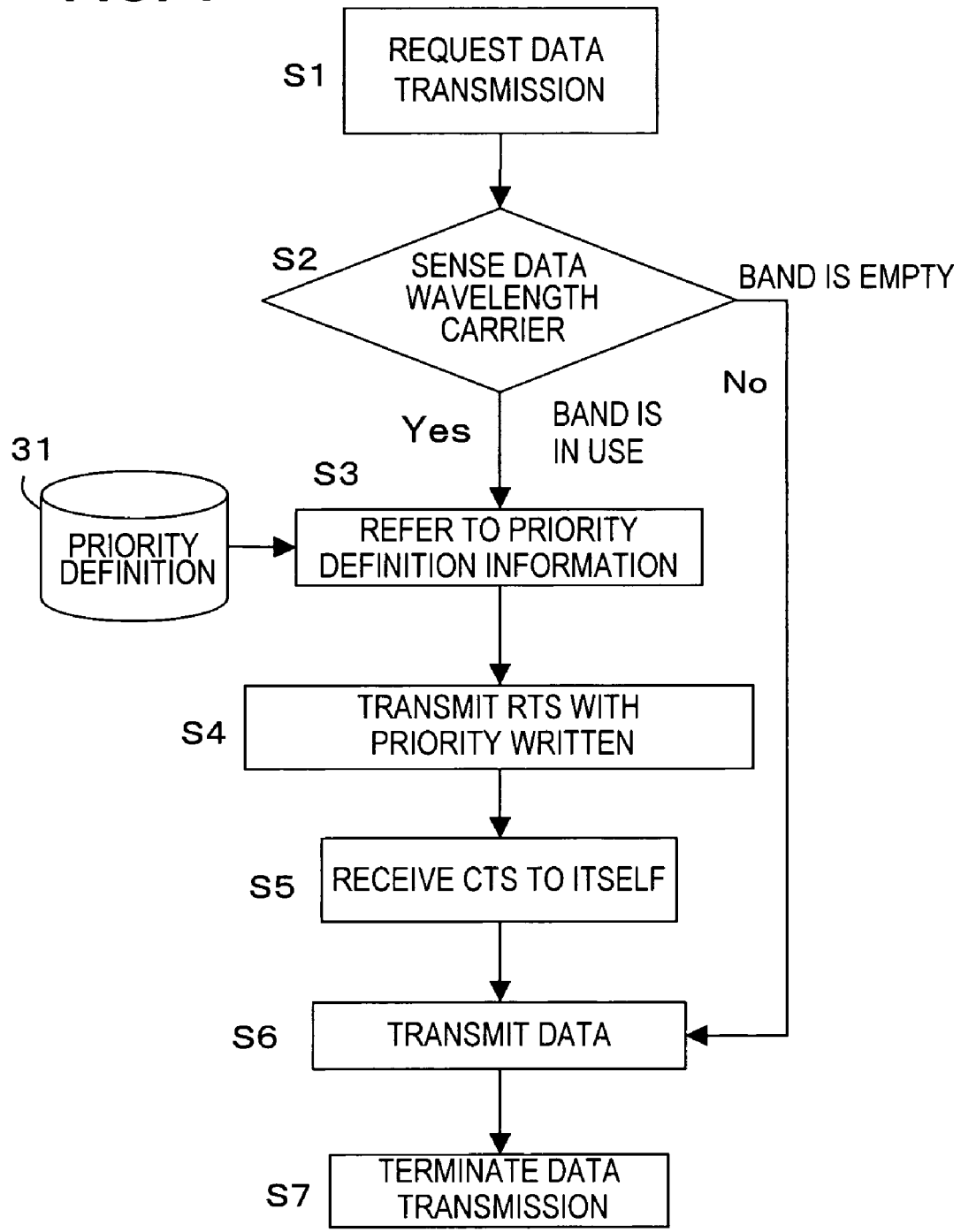

FIG. 12

| I | II | III |
|---|---|---|
| TIMESTAMP | MAC ADDRESS | PRIORITY |
| 00:00:00:01 | AA (CLIENT 2) | 3 |
| 00:00:00:02 | BB (CLIENT 3) | 2 |
| 00:00:00:03 | CC (CLIENT 4) | 1 |

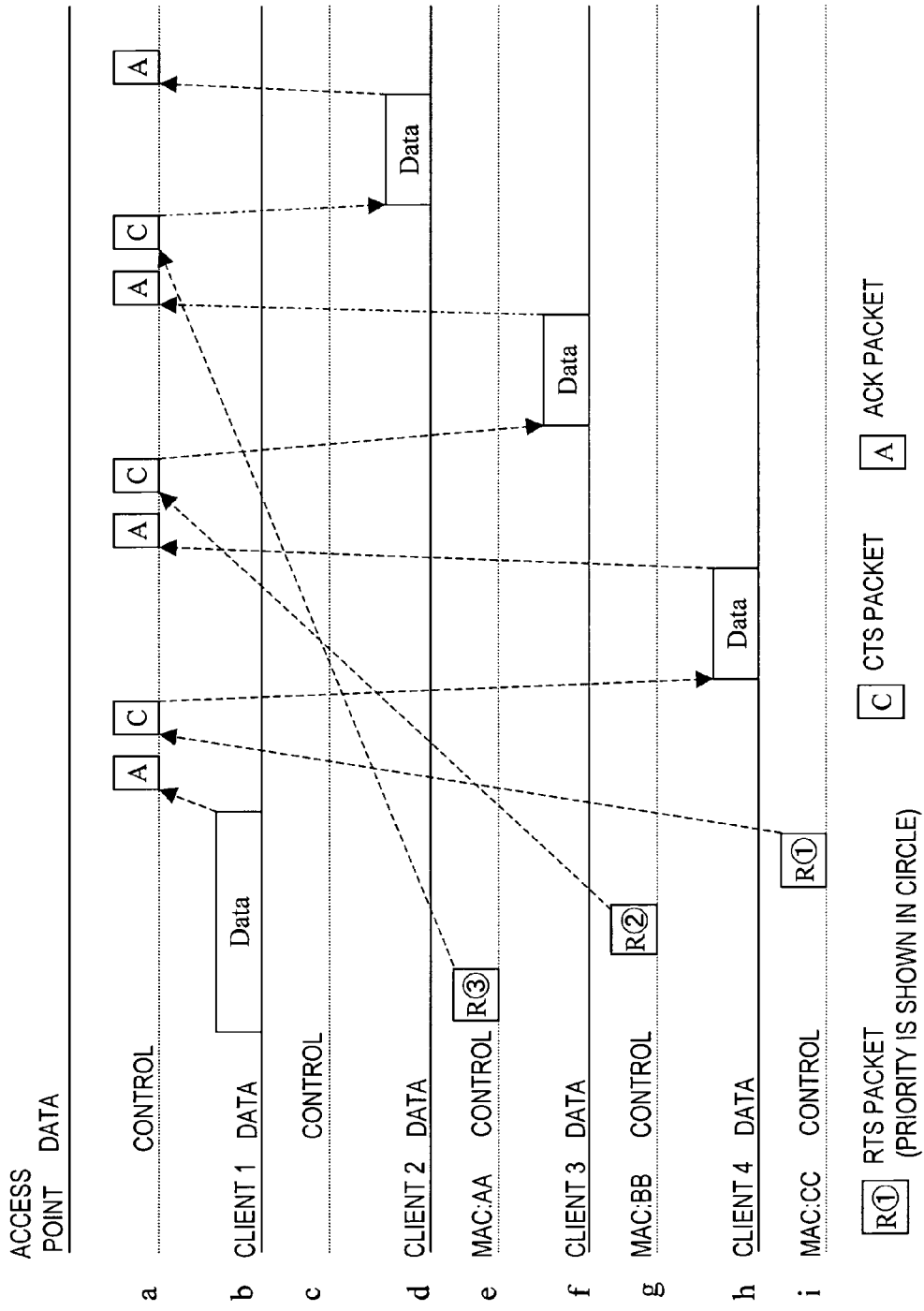

ACCESS CONTROL SYSTEM IN WIRELESS LAN SYSTEM

CROSS-REFERENCE TO RELATED APPLICATIONS

This application is the National Stage of International Application No. PCT/JP2003/012699, filed Oct. 3, 2003, now pending, the content of which is herein incorporated by reference.

TECHNICAL FIELD

The present invention relates generally to an access control system in a wireless LAN system, and more particularly, to an access control system controlling access depending on priorities.

BACKGROUND ART

A LAN (Local Area Network) standardization work has been promoted in the IEEE (Institute of Electrical and Electronics Engineers) 802 committee and the IEEE 802.11 subcommittee is carrying out a study on a wireless LAN system.

For an access control method between a plurality of client terminals CL in a wireless LAN system, a Carrier Sense Multiple Access with Collision Avoidance+Acknowledge mode (CSMA/CA+Ack) is employed as a MAC layer protocol, which is standardized by IEEE 802.11.

In the carrier sense multiple access with collision avoidance+acknowledge mode, communication is started after a client terminal wishing to communicate checks whether a carrier wave is sensed or not to confirm that communication has not been already performed by other client terminals.

FIG. 1 is a time chart showing how communication is performed in accordance with the carrier sense multiple access with collision avoidance+acknowledge mode. A plurality of client terminals CL1 to CL3 communicates through an access point AP.

In FIG. 1, for example, while the client terminal CL1 performs data communication, other client terminals CL2, CL3 cannot transmit data since a carrier wave is sensed during the communication of the client terminal CL1.

Other client terminals CL2, CL3 can transmit data after the carrier wave is not sensed because of termination of the data transmission of the client terminal C11.

However, in such a system, if the plurality of client terminals CL1 to CL3 is distant from each other such that radio waves transmitted by other client terminals cannot be sensed, a plurality of client terminals CL may determine that data can be transmitted and a collision may be generated by performing data transmission.

To avoid such inconvenience, a band reservation request mode (RTS/CTS: request to send/clear to send) is prescribed in IEEE 802.11 as another mode. FIG. 2 is a time chart how communication is performed in accordance with the band reservation request mode (RTS/CTS: request to send/clear to send).

In this mode, for example, a client terminal CL2 requesting communication transmits a band reservation request (RTS) frame. When receiving this RTS frame, an access point AP returns a transmission confirmation (CTS) frame to provide the client terminal CL 2 with the transmission right.

On this occasion, a MAC address of the client terminal CL provided with the transmission right is described in a destination MAC address region of the CTS frame and time (duration) required until data transmission/Ack frame response is described as well. Since electric waves can be received by all the client terminals CL within a reachable range from the access point AP, the CTS frame is received by all the client terminals CL.

Therefore, all the client terminals CL can determine which client terminal CL obtains the transmission right. The client terminals CL without the transmission right halts operation during the time described in the CTS frame. In this way, radio waves transmitted by a plurality of client terminals CL can be prevented from colliding.

However, in either access control mode shown in FIG. 1 and FIG. 2 (CSMA/CA, RTS/CTS) described above, only one wavelength band is used. Therefore, if another client terminal transmits radio waves, transmission cannot be performed. The access control is performed on the "first-come-first-served" basis between a plurality of client terminals CL when radio waves can be transmitted. Therefore, quality of service (QoS) cannot be guaranteed.

On the other hand, as a known technology, an example using a plurality of wavelength bands is proposed (patent document 1). In the technology described in the patent document 1, a different communication band is assigned to each of stations (terminals) corresponding to a plurality of client terminals. As a feature, when another terminal submit a communication request for one terminal already in communication, a control station puts the communication request into a queue and the communication is enabled in the order of the queue when the preceding communication is terminated.

Therefore, the technology described in patent document 1 is different from a technology on the premise of the carrier sense multiple access with collision avoidance (CSMA/CA) mode that senses the presence of the carrier wave to control the access.

(Patent Document 1)
Japanese Patent Application Laid-Open Publication No. 08-186567

DISCLOSURE OF THE INVENTION

In consideration of the above inconvenience and the prior arts, the object of the present invention is to provide a system to which is applied a carrier sense multiple access with collision avoidance (CSMA/CA) mode, more particularly, an access control system utilizing a plurality of wavelengths to control access depending on priorities in a wireless LAN system, which can ensure a transmission right depending on priorities among a plurality of clients.

A first aspect of an access control system according to the present invention to achieve the above object is an access control system in a wireless LAN system using an access point to perform access control for accesses from a plurality of client terminals, wherein an access point and each of a plurality of client terminals have a transmission device using a data transmission carrier wave frequency and a control signal transmission carrier wave frequency, wherein each of the plurality of client terminals has a memory storing priority information, wherein when the data transmission carrier wave frequency is not sensed on the wireless LAN, data are transmitted to the access point at a relevant data transmission carrier wave frequency, wherein when the data transmission carrier wave frequency is sensed on the wireless LAN, a band reservation request is sent to the access point at a relevant control signal transmission carrier wave frequency along with priority information stored in the memory, and wherein after a transmission confirmation is received from the access point for the band reservation request, data is transmitted to the access point at a relevant data transmission carrier wave frequency.

A second aspect of the access control system according to the present invention to achieve the above object is the access control system of the first aspect wherein the access point has a memory for storing a priority control table registering priority information included in a band reservation request sent from the client terminal, and wherein when preceding communication is terminated, a transmission confirmation for the band reservation request is sent to a relevant client terminal in the order of priorities in priority information registered in a priority control table stored in the memory.

A third aspect of the access control system according to the present invention to achieve the above object is the access control system of the first or the second aspect, wherein each priority of the priority information is defined correspondingly to an application generating a transmission request.

A fourth aspect of the access control system according to the present invention to achieve the above object is the access control system of the second aspect, wherein registration time, client identification information and a priority are registered for each piece of priority information in a priority control table for registering the priority information.

A fifth aspect of the access control system according to the present invention to achieve the above object is the access control system of the fourth aspect, wherein when a plurality of client terminals has the same priority of the priority information registered in the priority control table, the transmission confirmation is sent to a relevant client terminal in the order of time of the registration into the priority control table.

The features of the present invention will become more apparent from the following exemplary embodiments of the present invention that will be described with reference to the drawings.

BRIEF DESCRIPTION OF THE DRAWINGS

FIG. 4 is a diagram showing an operation flow of the client terminal of FIG. 3;

FIG. 12 is an example of content of a priority control table 13; and

FIG. 13 is a diagram showing an example of a time chart when data transmission is congested.

BEST MODE FOR CARRYING OUT THE INVENTION

An embodiment of the present invention will now be described in accordance with the drawings. The embodiment described below is for the purpose of describing the present invention and the technical scope of the present invention is not limited to this.

Figure 1:
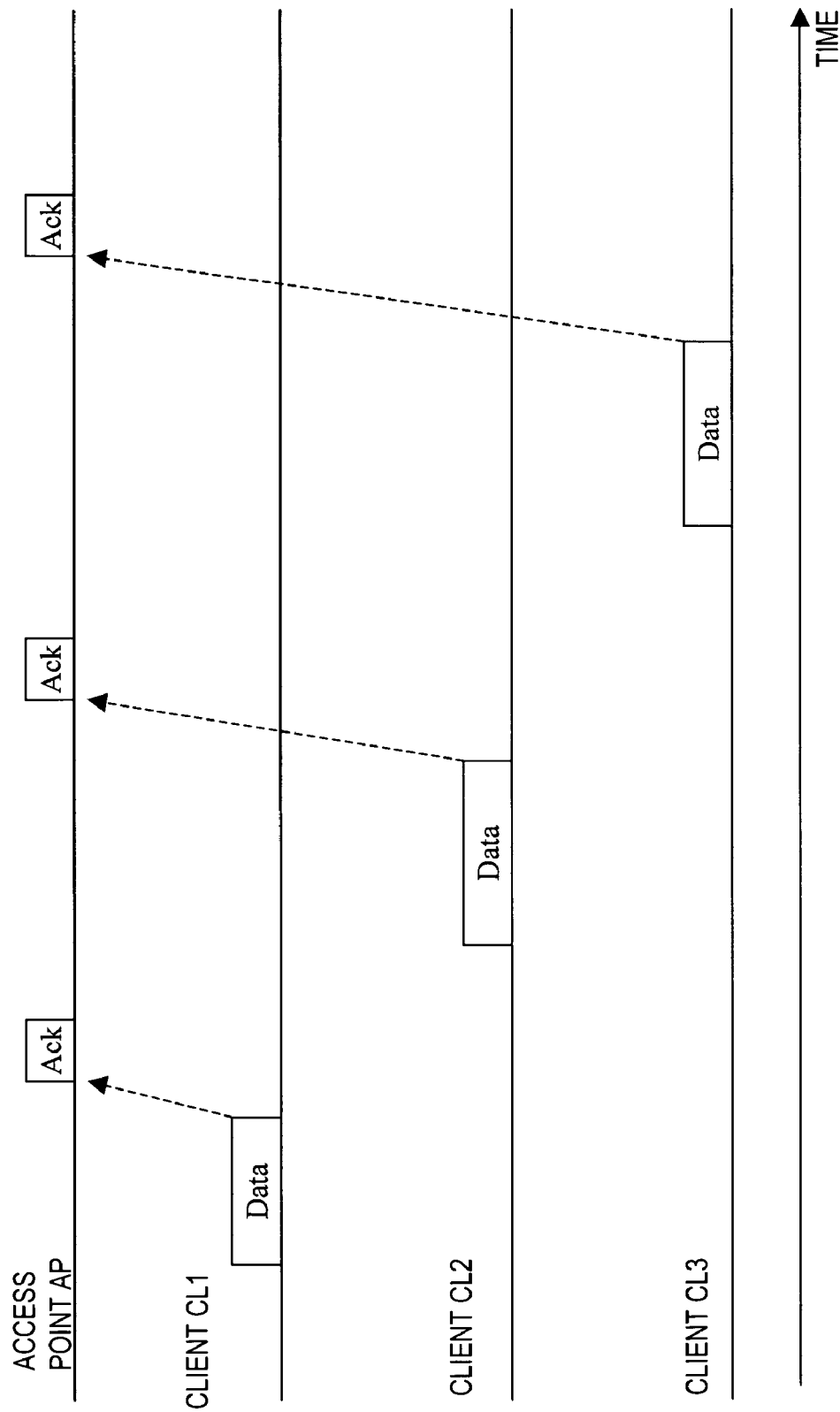
FIG. 1 is a time chart showing how communication is performed in accordance with a carrier sense multiple access with collision avoidance+acknowledge mode.
Figure 2:
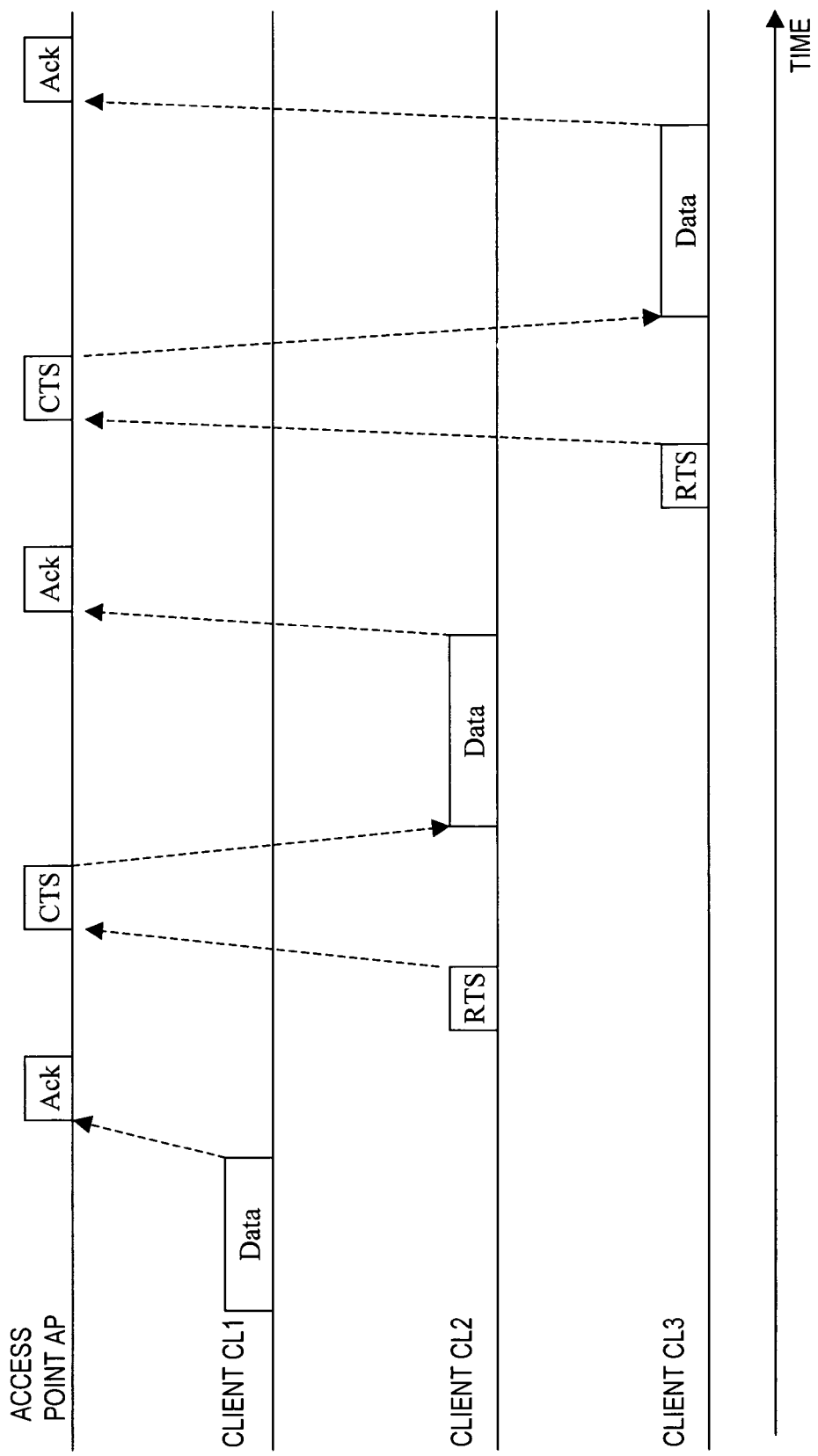
FIG. 2 is a time chart how communication is performed in accordance with a band reservation request mode (RTS/CTS: request to send/clear to send)
Figure 3:
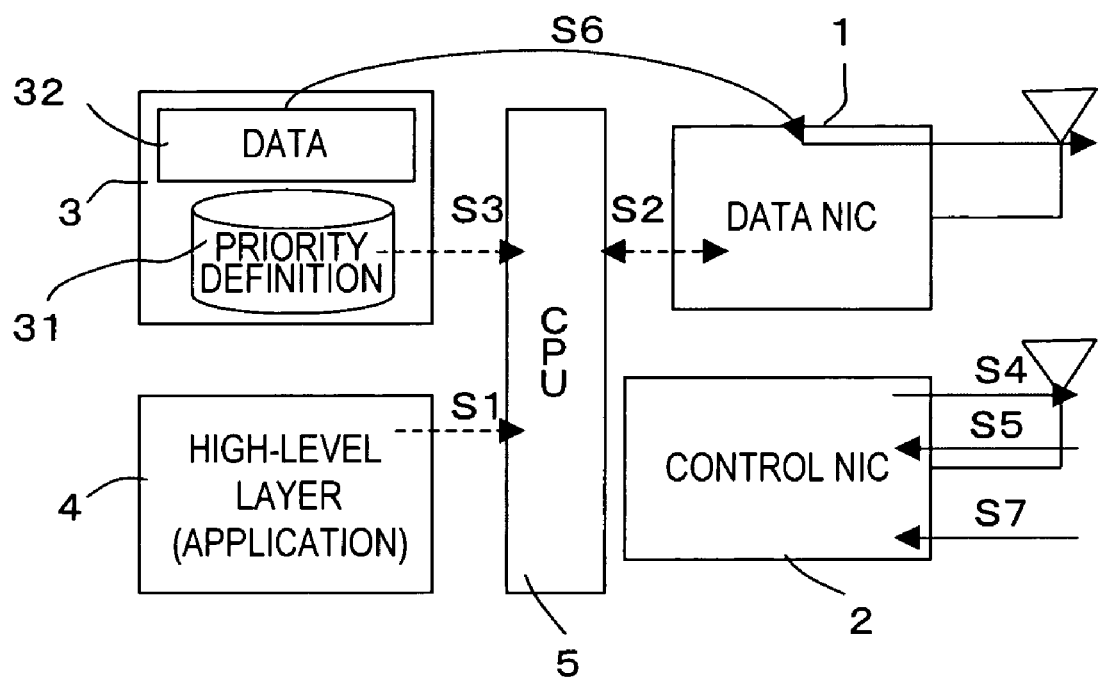
FIG. 3 is a block diagram showing a configuration example of a client terminal CL applied to an access control system of the present invention.

FIG. 3 is a block diagram showing a configuration example of a client terminal CL applied to an access control system of the present invention and FIG. 4 is a diagram showing an operation flow of the client terminal CL of FIG. 3.

In FIG. 3, solid line arrows show flows of data and dashed line arrows show flows of instructions. A client terminal CL has a data network card 1 and a control network card 2 that respectively have a function for sending and receiving data and a control signal at a different carrier wave frequency.

Since four wavelength bands can be used at the same time in a standard in accordance with IEEE 802.11b, two out of four wavelengths can be used respectively as carrier waves for the data communication and the control signal. In a system that can use IEEE 802.11a and IEEE 802.11b standards at the same time, 11a and 11b can separately be used for the data communication and the control signal, respectively.

As a feature of the present invention, a memory 3 of the client terminal CL stores priority information 31 corresponding to a type of an application 4. When a communication request is generated in the client terminal CL from the application 4 that is a high-level layer (step S1), a CPU 5 determines whether the data communication wavelength carrier wave is sensed in the data network interface card 1 (step S2).

If the data communication wavelength carrier wave is not sensed (step S2, No), it is determined that other client terminals do not perform data transmission since the band is in an empty state. Therefore, data can be transmitted to the access point AP with the data communication wavelength carrier wave (step S6).

If the data communication wavelength carrier wave is not sensed (step S2, No), as described as the problem of the carrier sense multiple access with collision avoidance+acknowledge mode, the position of the client CL may be distant so that the carrier wave cannot be sensed even though other clients CL performs communication. This case can be dealt with by switching to a band reservation request (RTS) mode since the access point does not return an acknowledgement (Ack) signal for a data signal transmitted from the client CL to the access point AP.

Figures 5A, 5B, 5C:
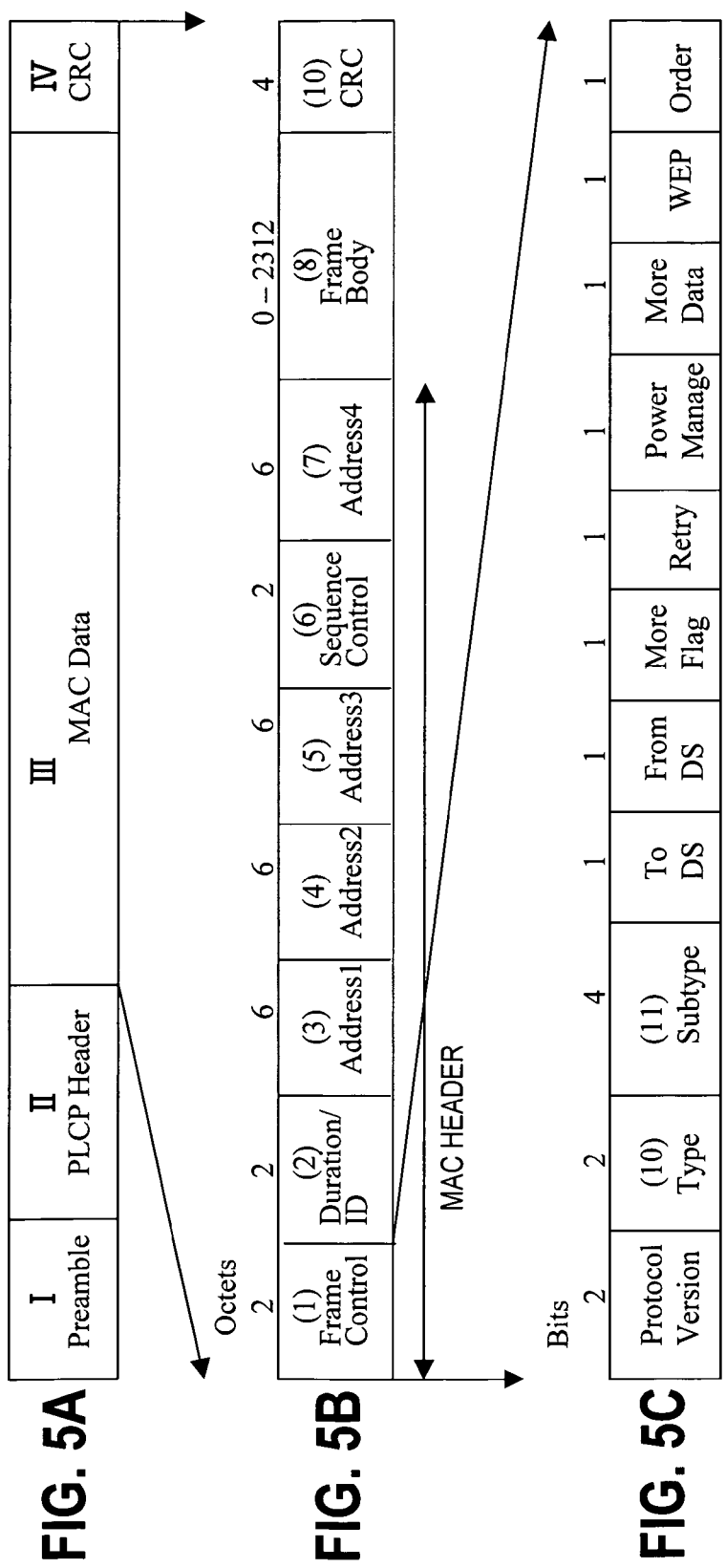
FIG. 5 is a diagram showing a data transmission format used in data communication in accordance with IEEE 802.11.

A data transmission format used in the data communication is as shown in FIG. 5 to 5C and conforms to IEEE 802.11.

In FIG. 5, the data transmission format has regions of a preamble I, a PLCP (Physical Layer Convergence protocol) header II, MAC data III, and a cyclic redundancy check symbol IV (FIG. 5A).

As shown in FIG. 5B, the MAC data III region has a MAC header including regions of frame control (1), duration identification (2), a plurality of addresses (3), (4), (5), (7) and sequence control (6), and a frame body (8) followed by a cyclic redundancy check symbol (9) region.

In the regions of the plurality of addresses (3), (4), (5), (7), a destination address and a transmission source address of data are registered.

The region of the frame control (1) has a configuration shown in FIG. 5C and a type of a frame is defined with a type (10) and a subtype (11).

Figure 6:
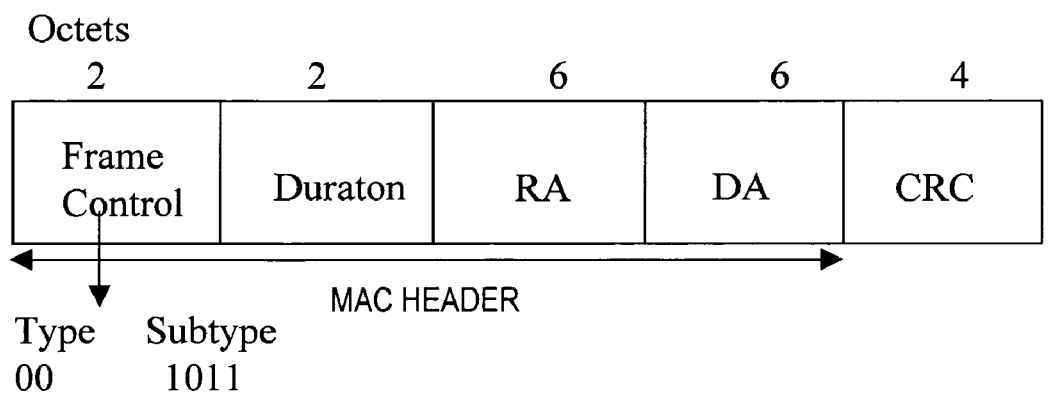
FIG. 6 is an explanatory diagram when the data transmission format is an RTS frame, according to the present invention.

For example, if the type (10) and the sub type (11) are configured as two bits and four bits, respectively, when the type (10) and the sub type (11) are 001011 as shown in FIG. 6, this means the RTS frame and the MAC header has the duration, the transmission source address RA and the destination address DA.

Figure 7:
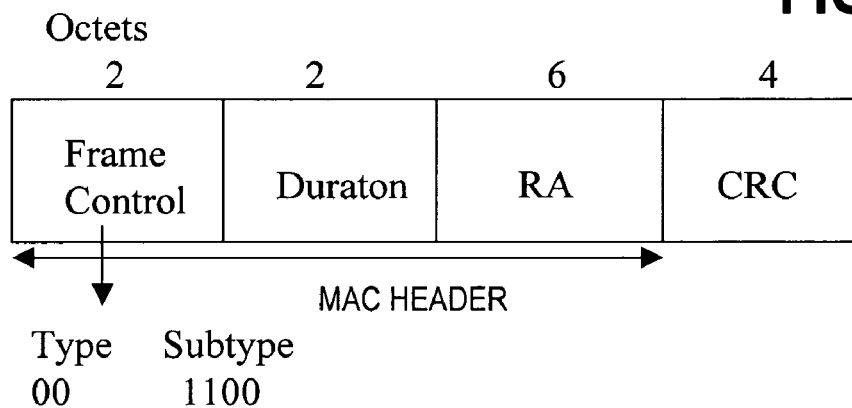
FIG. 7 is an explanatory diagram when the data transmission format is a CTS frame, according to the present invention.

When the type (10) and the sub type (11) are 001100 as shown in FIG. 7, this means the CTS frame and the MAC header has the duration and the transmission source address RA.

Figure 8:
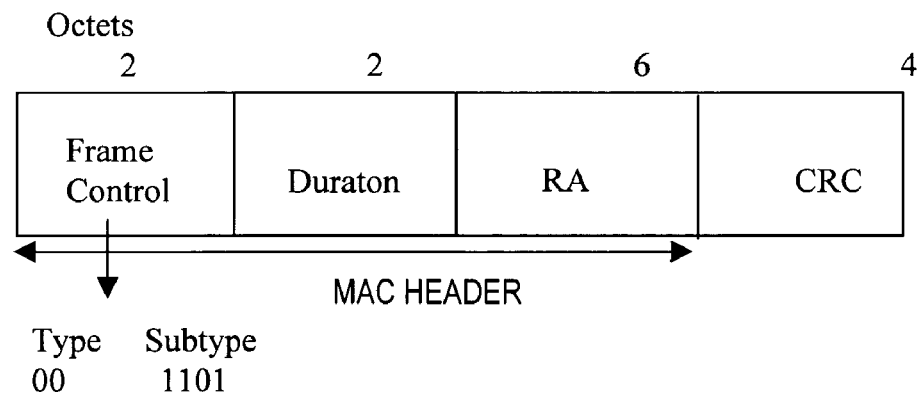
FIG. 8 is an explanatory diagram when the data transmission format is a CTS frame, according to the present invention.

When the type (10) and the sub type (11) are 001101 as shown in FIG. 8, this means the ACK frame and the MAC header has the duration and the transmission source address RA as well.

Returning to FIG. 4, if the data communication wavelength carrier wave is sensed (step S2, Yes), the data communication wavelength carrier wave is in use. In such a case, a band reservation request is transmitted to the access point AP as an RTS frame with a control signal wavelength carrier wave different from the data communication wavelength carrier wave.

According to the present invention, at the time of the band reservation request, by referring to priority definition information 31 in the memory 3 (step S3), priority information corresponding to the application submitting the transmission request is retrieved and written into the frame body (8) following the MAC header.

Figure 9:
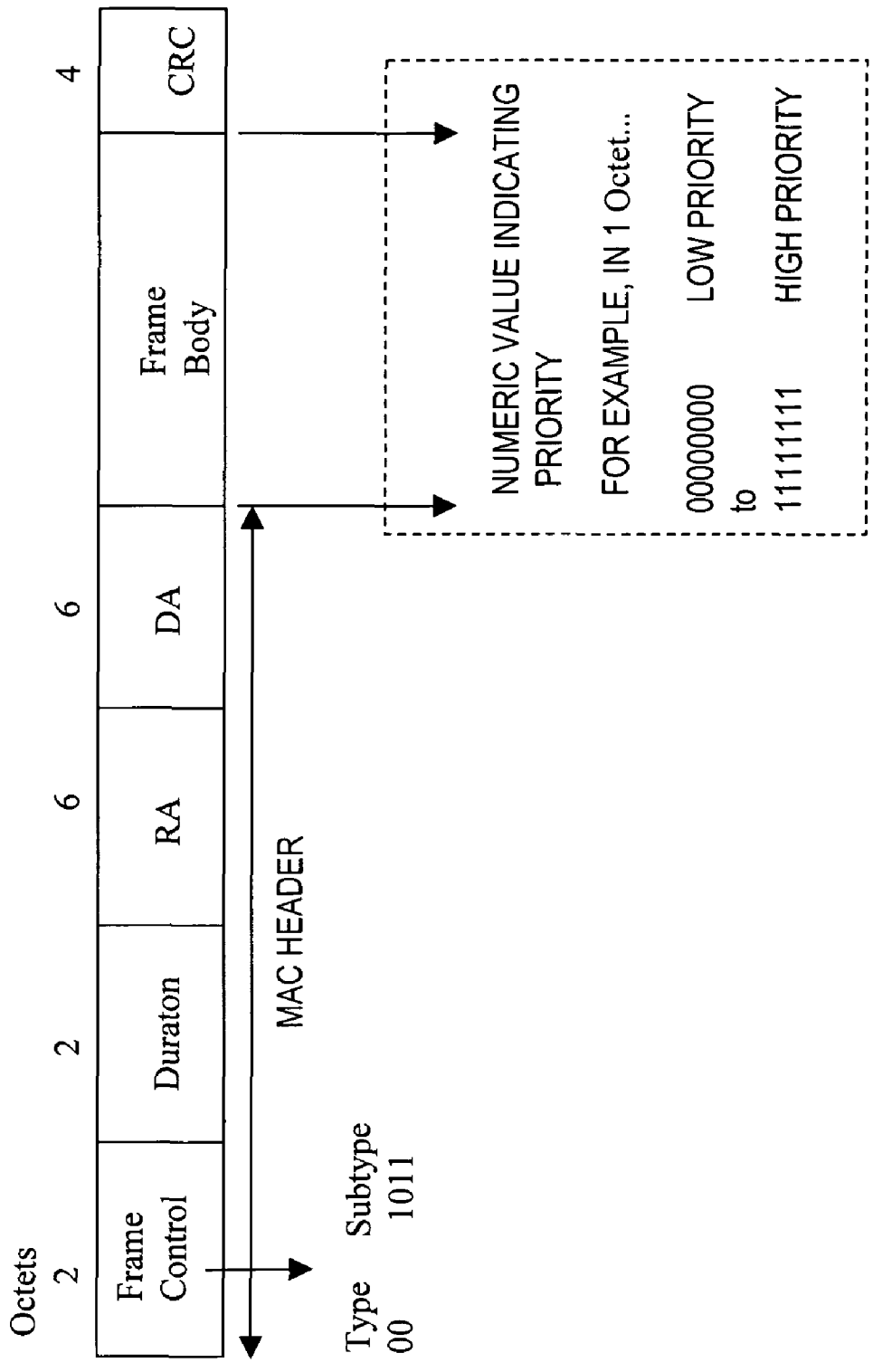
FIG. 9 is a diagram describing priority information written into a frame body (8) region.

FIG. 9 is a diagram describing priority information written into the frame body (8) region.

The priority information is, for example, one octet and information from a minimum priority 00000000 to a maximum priority 11111111 is written into the frame body (8) region.

The CPU 5 creates an RTS frame with the type and subtype set to "001011" in the frame control portion as shown in FIG. 6, which is sent to the access point AP with the control signal wavelength carrier wave through the control network interface card 2 (step S4).

For this RTS frame, when receiving from the access point AP a CTS frame (with the type (10) and subtype (11) regions of "001100" in the frame control as shown in FIG. 7) with an own address (step S5), data 32 stored in the memory 3 is transmitted from the data network card 1 (step S6).

The data transmission is terminated by receiving an ACK frame (with the type (10) and subtype (11) regions of "001101" in the frame control of FIG. 7C) from the access point AP (step S7).

Figure 10:
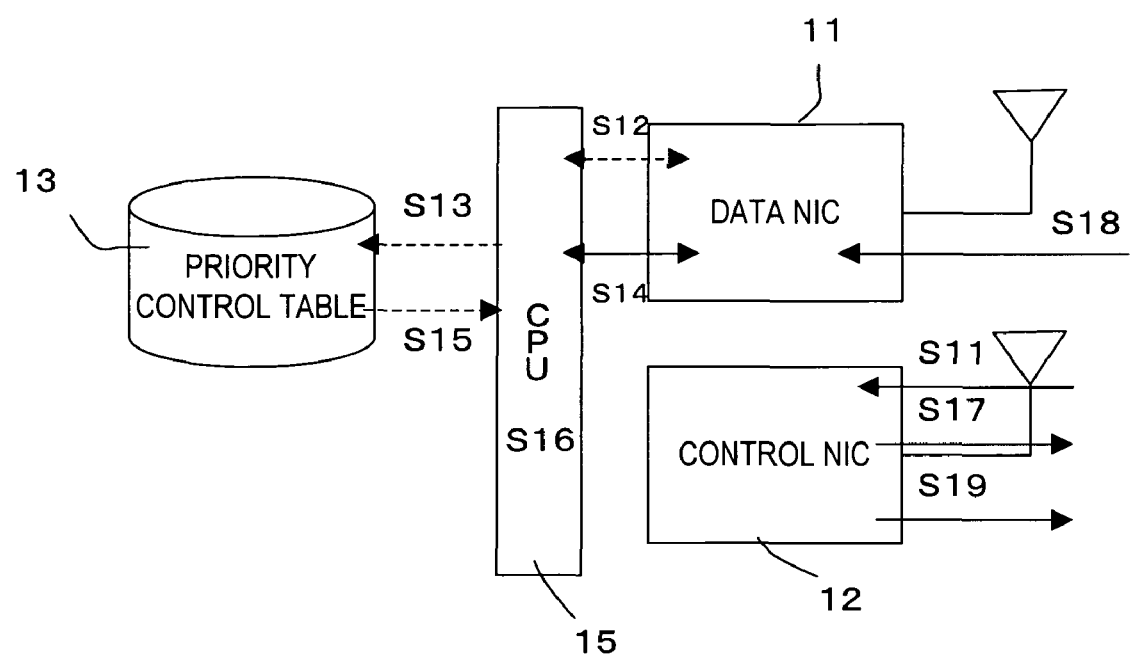
FIG. 10 is a diagram showing a configuration of an access point AP applied to the access control system of the present invention.

FIG. 10 is a diagram showing a configuration of an access point AP, which has a data network card 11 and a control network card 12 as is the case with the client terminal CL and which has a function for sending and receiving data and a control signal with carrier waves having different wavelengths.

Figure 11:
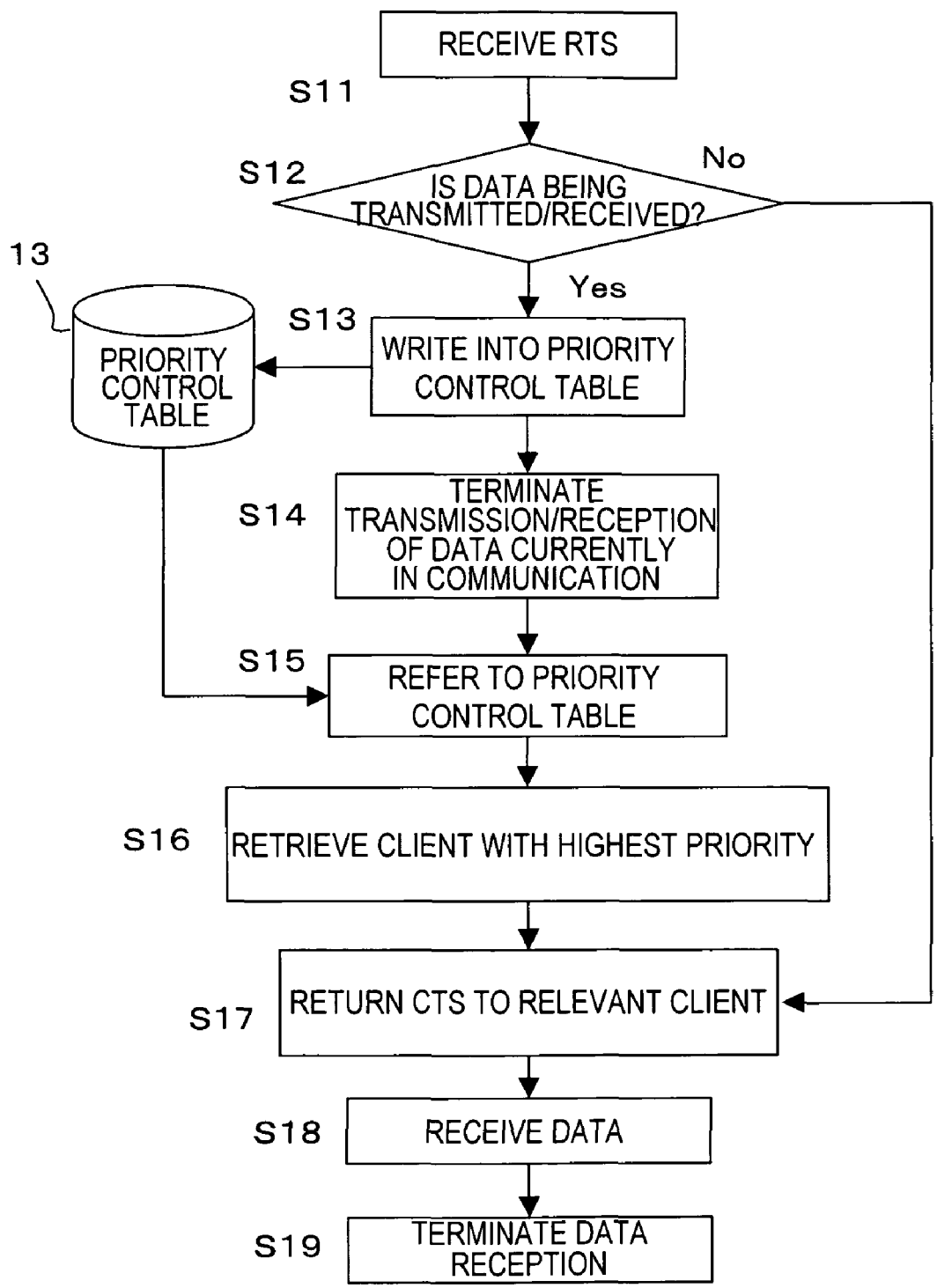
FIG. 11 is a diagram showing an operation flow of the access point AP correspondingly to the configuration of FIG. 10.

FIG. 11 is a diagram showing an operation flow of the access point AP correspondingly to the configuration of FIG. 10. In FIG. 11, when receiving an RTS frame from the client terminal CL (step S11), a CPU 15 determines whether data are being transmitted and received or not (step S12) and if data are not being transmitted and received (step S12, No), a CTS frame is returned to a relevant client CL (step S17).

If data are being transmitted and received (step S12, Yes), the priority information recorded in a region within the frame bode (see FIG. 9: 8) is extracted from an RTS frame and the CPU 15 registers the priority information into a priority control table 13 (step S13).

FIG. 12 is an example of content of the priority control table 13. Registration stamp time I, a MAC address II of clients and a priority III are recorded.

When the transmission/reception of the data currently communicated is terminated (step S14), the CPU 15 refers to the priority control table 13 (step S15). With this references a client with the highest priority is retrieved (step S16).

A CTS frame is then returned to the retrieved client CL (step S17). In this way, a client CL available for communication is identified; data is received (step S18); and the data reception is terminated subsequently (step S19).

At step S17 described above, when the CTS frame is returned to the relevant client terminal CL, relevant priority information is deleted from the priority control table 13.

In this way, after the data reception is terminated, communication can be performed with a client terminal CL that has sent out the next highest priority.

When referring to the priority control table 13 to retrieve the priority information, if clients with the same priority are registered, for example, the CTS frame can be returned in ascending order of the registration stamp time I in the content of the priority control table 13 shown in FIG. 12.

FIG. 13 is a diagram showing an example of a time chart when a client is already in communication, i.e., when data transmission is congested, in the description of the embodiment. In FIG. 13, when a client CL1 is in communication, if a band reservation request is submitted from each of clients CL2, CL3, CL4, RTS signals are sent to the access point AP with the use of the control wavelength carrier waves.

In the example of FIG. 13, the priority information written into the RTS signals from the clients CL2, CL3, CL4 is in the order of CL4>CL3>CL2. Therefore, when the communication of the client CL1 is terminated, a CTS signal is sent to the client CL4 with the maximum priority, which is provided with the communication right. The client CL4 provided with the communication right can perform data transmission with the use of the data communication wavelength carrier wave.

When the communication of the client CL4 is terminated, the client CL3 with the next highest priority can perform communication. When the communication of the client CL3 is terminated, the client CL2 can perform communication.

Industrial Applicability

As in the description of the present invention with the embodiment, priority control can be achieved in a wireless LAN system. Therefore, the present invention can provide an access control system for utilizing a plurality of wavelengths in a wireless LAN system, which can ensure a transmission right depending on priorities among a plurality of clients.

The invention claimed is:

1. An access control system in a wireless LAN system using an access point to perform access control for accesses from a plurality of client terminals,
wherein said access point and each of a plurality of client terminals have a transmission device using a data transmission carrier wave frequency and a control signal transmission carrier wave frequency,
wherein each of the plurality of client terminals has a memory storing priority information,
wherein when the data transmission carrier wave frequency is not sensed on the wireless LAN, data are transmitted to the access point at a relevant data transmission carrier wave frequency, wherein when the data transmission carrier wave frequency is sensed on the wireless LAN, a band reservation request is sent to the access point at a relevant control signal transmission carrier wave frequency along with priority information stored in the memory, and wherein after a transmission confirmation is received from the access point for the band reservation request, data is transmitted to the access point at a relevant data transmission carrier wave frequency.

2. The access control system according to claim 1, wherein the access point has a memory for storing a priority control table registering priority information included in a band reservation request sent from the client terminal, and wherein when preceding communication is terminated, a transmission confirmation for the band reservation request is sent to a relevant client terminal in the order of priorities in priority information registered in a priority control table stored in the memory.

3. The access control system according to claim 1, wherein each priority of the priority information is defined correspondingly to an application generating a transmission request.

4. The access control system according to claim 2, wherein each priority of the priority information is defined correspondingly to an application generating a transmission request.

5. The access control system according to claim 2, wherein registration time, client identification information and a priority are registered for each piece of priority information in a priority control table for registering the priority information.

6. The access control system according to claim 5, wherein when a plurality of client terminals has the same priority of the priority information registered in the priority control table, the transmission confirmation is sent to a relevant client terminal in the order of time of the registration into the priority control table.

7. A client terminal applied to a wireless LAN system using an access point to perform access control, comprising:

a transmission device using a data transmission carrier wave frequency and a control signal transmission carrier wave frequency;

a memory storing priority information, wherein when the data transmission carrier wave frequency is not sensed on the wireless LAN, data are transmitted to the access point at a data transmission carrier wave frequency, wherein when the data transmission carrier wave frequency is sensed on the wireless LAN, a band reservation request is sent to the access point at the control signal transmission carrier wave frequency along with priority information stored in the memory, and wherein after a transmission confirmation is received from the access point for the band reservation request, data is transmitted to the access point at the data transmission carrier wave frequency.

8. An access point applied to a wireless LAN system performing access control for a plurality of client terminals, comprising:

a transmission device using a data transmission carrier frequency and a control signal transmission carrier frequency, which is different from the data transmission carrier frequency; and a memory storing a priority control table for registering priority information included in a band reservation request sent from a client terminal, wherein when preceding communication is terminated, a transmission confirmation for the band reservation request is sent to a relevant client terminal in the order of priorities in priority information registered in a priority control table stored in the memory.

9. An access control method of data transmission from a plurality of client terminals using an access point in a wireless LAN system, the method comprising:

storing priority information corresponding to an application into a memory in each of the plurality of client terminals;

when a carrier wave frequency is not sensed on the wireless LAN, transmitting data to the access point at a data transmission carrier wave frequency, when a carrier wave frequency is sensed on the wireless LAN, sending a band reservation request to the access point at a control signal transmission carrier wave frequency along with priority information stored in the memory, and after a transmission confirmation is received from the access point for the band reservation request, transmitting data to the access point at a data transmission carrier wave frequency.

* * * * *